(12) United States Patent
Klein (10) Patent No.: US 10,365,064 B2
(45) Date of Patent: Jul. 30, 2019

(54) MOUNT FOR RANGEFINDERS AND OTHER AUXILIARIES FOR SHOOTING DEVICES

(71) Applicant: John Christopher Klein, Bella Vista, AR (US)

(72) Inventor: John Christopher Klein, Bella Vista, AR (US)

(73) Assignee: Explore Scientific, LLC, Sprindale, AR (US)

( * ) Notice: Subject to any disclaimer, the term of this patent is extended or adjusted under 35 U.S.C. 154(b) by 257 days.

(21) Appl. No.: 15/367,163

(22) Filed: Dec. 1, 2016

(65) Prior Publication Data

US 2017/0191787 A1 Jul. 6, 2017

Related U.S. Application Data

(60) Provisional application No. 62/387,669, filed on Dec. 31, 2015.

(51) Int. Cl.
| | |
|---|---|
| *F41B 5/14* | (2006.01) |
| *F41G 3/06* | (2006.01) |
| *F41G 1/467* | (2006.01) |
| *G01S 17/08* | (2006.01) |
| *G01S 17/88* | (2006.01) |

(52) U.S. Cl.
CPC ............ *F41B 5/1403* (2013.01); *F41G 1/467* (2013.01); *F41G 3/06* (2013.01); *G01S 17/08* (2013.01); *G01S 17/88* (2013.01)

(58) Field of Classification Search
CPC . F41G 11/003; F41G 1/36; F41G 3/02; F41G 3/06; F41G 3/065; F41G 3/08; F41G 3/12; F41G 3/142; F41G 3/16; F41G 7/008; F41G 7/2246; F41G 7/263
USPC .......................................................... 33/228
See application file for complete search history.

(56) References Cited

U.S. PATENT DOCUMENTS

| | | | |
|---|---|---|---|
| 4,473,959 | A | 10/1984 | Saltzman |
| 5,092,053 | A | 3/1992 | Roberts |
| 5,495,675 | A | 5/1996 | Huang |
| 5,694,698 | A | 12/1997 | Slates |
| 6,073,352 | A | 6/2000 | Zykan et al. |
| 6,079,111 | A | 6/2000 | Williams et al. |
| 6,477,778 | B1 | 11/2002 | Lorocco |
| 6,612,299 | B2 | 9/2003 | Martin et al. |
| 6,634,110 | B2 | 10/2003 | Johnson |
| 6,862,813 | B1 | 3/2005 | Chen et al. |

(Continued)

FOREIGN PATENT DOCUMENTS

CN 202836358 U 3/2013

*Primary Examiner* — Yaritza Guadalupe-McCall
(74) *Attorney, Agent, or Firm* — James L. Neal (57) ABSTRACT

A system and apparatus for mounting accessory devices on projectile launching devices is described. Particularly, a mounting system for rangefinders which facilitates rotary movement of mounting elements about multiple axes and linear movement of mounting elements along multiple paths is described. In the case of a device for mounting rangefinders on shooting devices, the mounting device enables the position of the rangefinder to be fixed prior to mounting the rangefinder on the shooting device so that the rangefinder when mounted is aligned and calibrated to the viewfinder of the shooting device. This enables a user to compensate for the trajectory of a projectile over the range or distance between the user and the target.

3 Claims, 7 Drawing Sheets

(56) References Cited

U.S. PATENT DOCUMENTS

| | | |
|---|---|---|
| 7,086,161 B2 | 8/2006 | Ellig |
| 7,278,216 B2 | 10/2007 | Grace |
| 7,331,112 B2 | 2/2008 | Gibbs |
| 7,412,771 B2 | 8/2008 | Bradley et al. |
| 7,574,811 B2 | 8/2009 | Zurtzhals et al. |
| 7,584,543 B1 * | 9/2009 | Boyd ............... F41G 1/467 124/87 |
| 7,959,120 B2 | 6/2011 | Liao |
| 8,616,789 B1 | 12/2013 | Hutchison |
| 8,619,238 B2 * | 12/2013 | Overstreet ........ F41G 1/467 356/3.01 |
| 8,689,454 B2 | 4/2014 | Pulkrabek et al. |
| 8,739,419 B1 * | 6/2014 | Pulkrabek ........ F41G 1/467 124/87 |
| 8,826,551 B2 | 9/2014 | Gibson |
| 9,097,491 B2 | 8/2015 | Summers et al. |
| 9,429,392 B1 * | 8/2016 | Ledbetter ......... F41G 1/467 |
| 2008/0231829 A1 | 9/2008 | Hinchliff et al. |
| 2013/0000177 A1 * | 1/2013 | Holmberg ......... F41G 1/473 42/142 |
| 2013/0174430 A1 | 7/2013 | Pulkrabek et al. |
| 2014/0138416 A1 | 5/2014 | Tron |
| 2014/0171238 A1 * | 6/2014 | Bay ................... F41G 1/35 473/570 |
| 2014/0259853 A1 | 9/2014 | Crispin |
| 2017/0191787 A1 * | 7/2017 | Klein ................ F41B 5/1403 |
| 2017/0227326 A1 * | 8/2017 | Chesney ........... F41G 1/467 |

* cited by examiner

MOUNT FOR RANGEFINDERS AND OTHER AUXILIARIES FOR SHOOTING DEVICES

BACKGROUND

Shooting devices, particularly bows and other archery devices, handguns and rifles have affixed thereto sighting devices and rangefinding devices that enable a user to sight a target, determine the distance or range to the target and adjust the elevation of the shooting device according to the range. Even though a number of sighting and rangefinding devices are available difficulties in accurately calibrating and aiming rangefinders remain a persistent problem. With laser rangefinders in particular an easy-to-use, inexpensive rangefinder mounting system that will facilitate adjustment of the position of the rangefinder with respect to the shooting device and viewfinder is needed.

Several U.S. patents relating to rangefinders and/or viewfinders of such types are: U.S. Pat. No. 6,073,352 to Zykan et al.; U.S. Pat. No. 6,634,110 to Johnson; U.S. Pat. No. 7,086,161 to Ellig, et al.; U.S. Pat. No. 8,619,238 to Overstreet; and U.S. Pat. No. 8,739,419 to Pulkrabek, et al; all of which are incorporated herein by reference.

SUMMARY

A mounting device here disclosed is attached to a shooting device for the purpose of mounting thereon an auxiliary device such as a rangefinder or other accessory. The mounting device is articulable so that a mounted device, such as a rangefinder, can be aligned and calibrated to a viewfinder or sighting device on the shooting device to enable a user to more accurately compensate for the trajectory of a projectile over the range or distance between the user and the target.

When the rangefinder and the sighting device are mounted on the shooting device they are offset from each other. This occurs due to the physical constraints of mounting them and to avoid interference with the user's line of sight and the projectile path. To compensate for the offset the mounting device is adjustable to enable the position of a rangefinder mounted thereon to be adjusted. Adjustments to the rangefinder position can be made with respect to various orientations so that the user's actual line of sight through the sighting device when shooting and the view path of the rangefinder intersect at the target. For example, the mounting device can reciprocate along any or all of an (x) axis, a (y) axis and a (z) axis; it can be rotated about any or all of the (x), (y) and (z) axes. When considered in reference to a shooting device held by a user parallel to a horizontal ground surface, it can be said that the mounting device can be adjusted left or right, up or down, rotated clockwise or counterclockwise about a vertical axis and rotated about a horizontal axis to tip forward (pointing down) or back (pointing up).

DETAILED DESCRIPTIONS OF DRAWINGS

Figure 1:
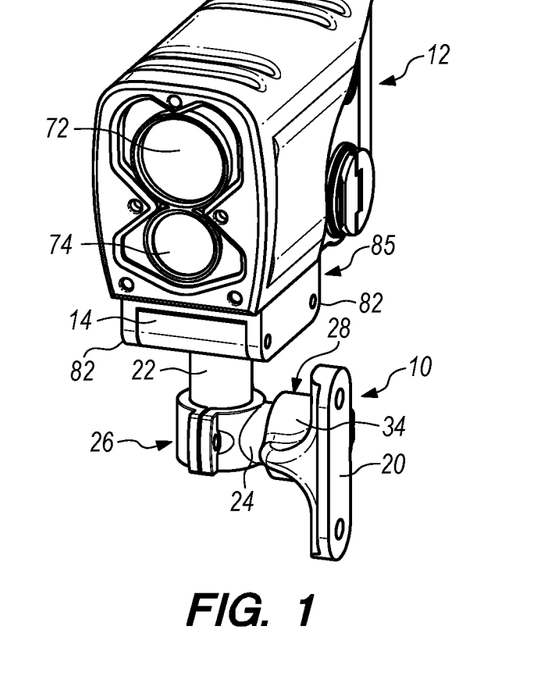
FIG. 1 is a perspective view of a mounting apparatus for use with an archer's bow with a rangefinder attached, as viewed from the field.
Figure 2:
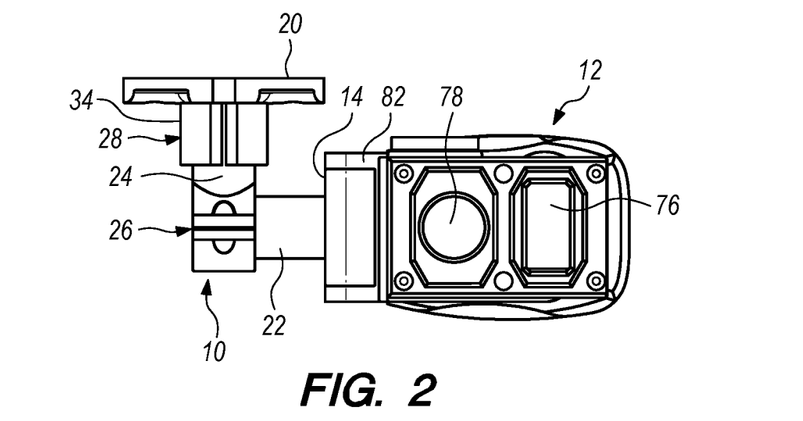
FIG. 2 shows the assembly of FIG. 1 as viewed from the perspective of a user.
Figure 3:
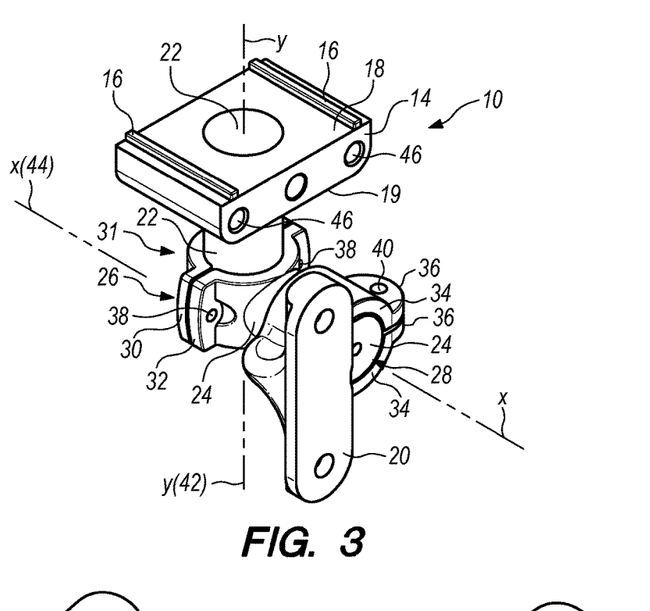
FIG. 3 is a perspective view of a mounting apparatus adapted to be attached to a projectile launching device.

Referring to FIGS. 1 and 2, a mounting means 10 adapted to be mounted on a projectile launching device, not shown, supports an attached rangefinder 12. Details of one embodiment of the mounting apparatus (or device) 10 are shown by FIG. 3.

Figure 5:
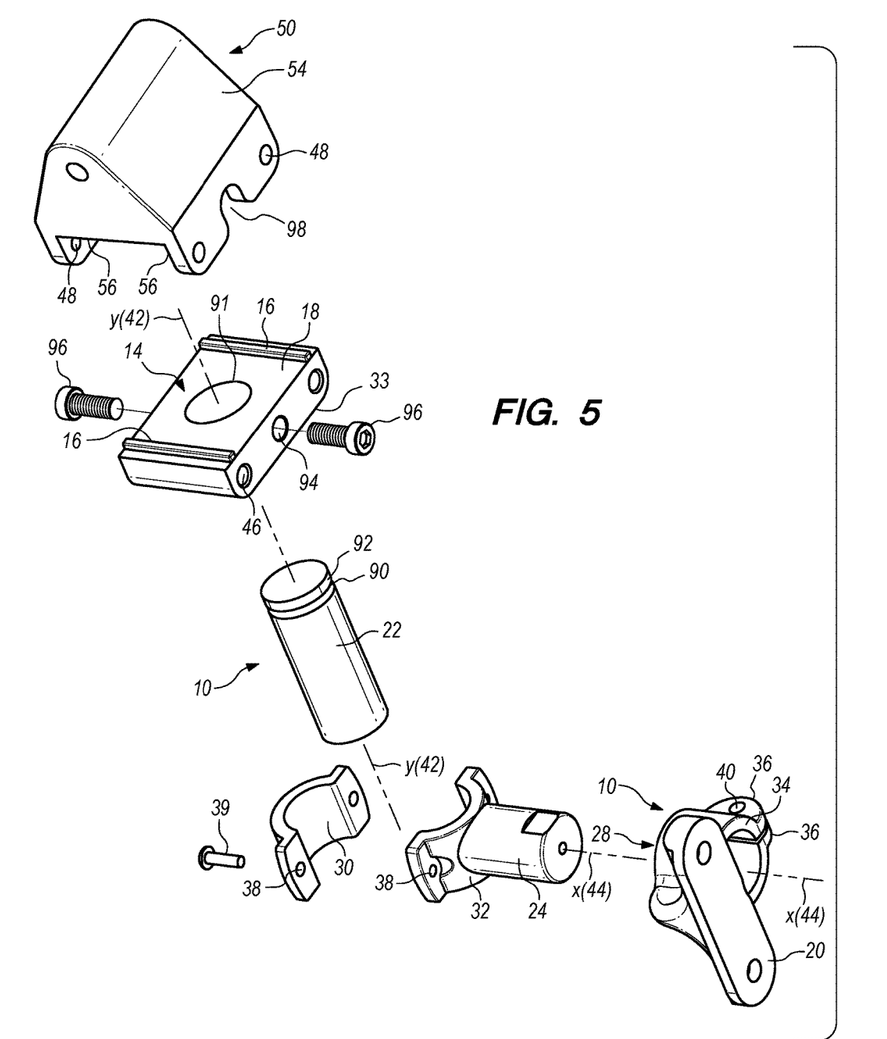
FIG. 5 is an exploded perspective view of an embodiment of the invention showing individual elements.

The mounting device 10 has a mounting structure in the form of a platform or plate 14 having two elements in the form of lugs 16 on its obverse, mating surface 18. The plate 14 is connected through an articulable means to a second mounting structure in the form of a bracket 20. The articulable means is comprised of segments and joints forming an articulable linkage 31 that will now be described. The reverse surface 33 of the mounting plate 14 is fixedly supported on a rigid first rod or shaft 22, the plane of the surface 33 being substantially perpendicular to the longitudinal axis of the shaft 22. A segment of the shaft 22 remote from the reverse surface 33 is supported in journal box 26 and acts as a journal so the shaft 22 is rotatable about a Y axis (42) in a first bearing sleeve or first journal box 26. In FIG. 3 the journal box 26 is formed of two half-sleeves 30 and 32. The half-sleeves are joined in any convenient manner. In the example shown the half-sleeves are connected by allen screws 39 (as shown in FIG. 5) in threaded openings 38. The half-sleeves 30 and 32 are joined so as to hold the parts together and are also capable of permitting rotary motion about the Y axis to be applied to mounting plate 14 and shaft 22. The shaft 22 may also be moved longitudinally, in a linear path along the Y axis, to increase and decrease the distance between the mounting plate and the journal box 26. The allen screws 39 in the threaded openings 38 are loosed the permit the described motions of the shaft 22 in the journal box 26 and tightened to prevent motion. A rigid second shaft 24 is fixed to element 32 of the first journal box 26 and extends along an X axis (44) in approximate perpendicular orientation to the longitudinal axis of the shaft 22. A segment of the second shaft 24 opposite the first journal box 26 is held in a second bearing sleeve or second journal box 28 for longitudinal and rotary motion therein. The journal box 28 is formed of a "C" shaped sleeve 34 with flanges 36 slightly open and joined by an allen screw (not shown) in threaded opening 40. The flanges 36 are adjustably joined by the allen screw so as to vary the compression exerted by the sleeve 34 on the shaft 24. Depending on the magnitude of the compression this permits or prevents linear and rotary motion of the shaft 24 within the journal box 28. Specifically, the holding force of sleeve 34 is relaxed to permit rotary motion of the shaft 24 about the X axis and motion of the shaft 24 in a linear path along the X axis to, respectively, alter the orbital position of the mounting plate 14 and increase or decrease the distance between the journal boxes 26 and 28. The holding force of the sleeve 34 is tightened to prevent rotary motion of the shaft 24 about the X axis and linear motion of the shaft 24 along the X axis to fix the relative positions of the second shaft 24 and the second journal box 28. The bracket 20 for affixing or attaching the entire assembly to a projectile launching device is rigidly connected to the second journal box 28. In a preferred embodiment the bracket 20 is press fitted onto the sleeve 34 using a dowel press fitted into mating holes. From the foregoing it is seen that the first shaft 22 and the first journal box 26 form an articulable joint that can either permit or prevent rotary and linear motion. Similarly, the second shaft 24 and the second journal box 28 form another articulable joint that can either permit or prevent rotary and linear motion.

As aforesaid, allen screws or other convenient tightening devices are used to alternately permit or restrict relative motion between the shafts 22 and 24 and their journal boxes 26 and 28 when adjustments to align the position of the mounting plate 14 are being made. The mounting plate 14 is aligned with respect to the various orientations so that a user's actual line of sight through a sighting device on a projectile launcher and the view from a rangefinder mounted on the mounting plate 14 intersect at a selected target. When the desired alignment is achieved the user tightens the allen screws or other tightening devices to fix the mounting plate 14 in place.

Figures 4A, 4B:
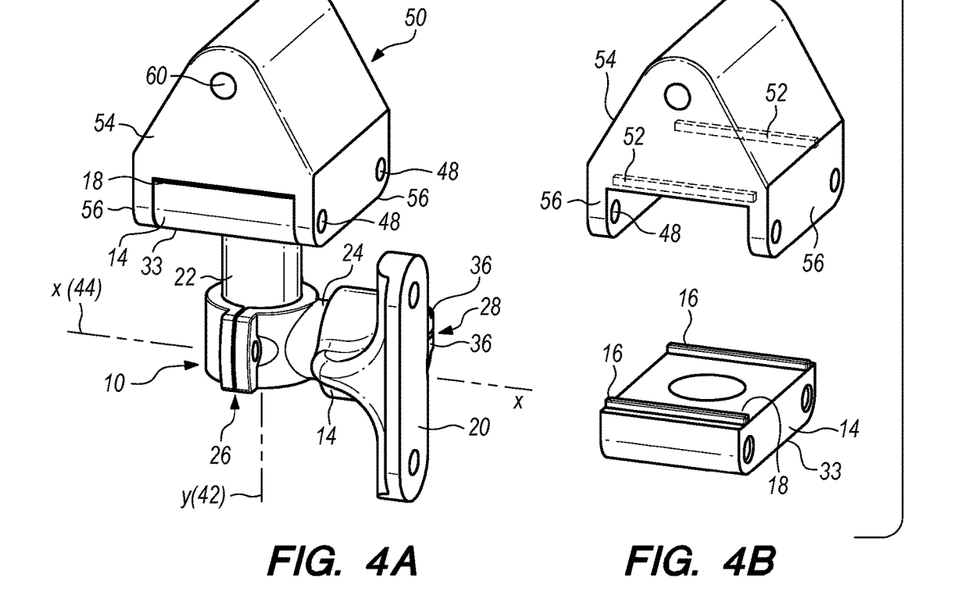
FIG. 4A shows the mounting apparatus of FIG. 3 with an aligning projector mounted thereon.
FIG. 4B is an exploded view of the aligning projector of FIG. 4A.

FIGS. 4A and 4B show the mounting device 10 having a laser projector 50 mounted on the mounting plate 14 to be used for aligning the mounting plate to calibrate the position of the plate with respect to a sighting device. When the mounting plate is aligned and fixed in place the laser aligning projector 50 is removed and a rangefinder or other auxiliary device is installed on the mounting plate 14. The lugs or ridges 16 on the obverse surface 18 of the mounting plate 14 mate with complementary elements formed as slots or grooves 52 in the housing 54 of the laser projector 50. When the laser projector 50 is attached to the mounting device 10 the lugs and slots align the laser projector 50 on the mounting plate 14, in a predetermined orientation to the mounting plate. (It will be appreciated that the lugs could as well be on the housing 54 of the laser projector 50 and the slots could be on the surface 18 of the mounting plate 14.) Flanges 56 are formed on the housing 54 of the laser projector to facilitate attachment of the housing to the mounting plate 14. The flanges 56 straddle the mounting plate 14 to bring the openings 48 on the flanges into alignment with threaded openings 46 on the mounting plate. The mounting device 10 and the laser projector 50 are attached to each other by allen screws in the openings 48 formed in the flanges 56 and threaded openings 46 (also shown in FIG. 5) in mounting plate 14. This affixes mounting plate 14 and the laser projector 50 to each other. A visible laser projector 60 in the housing 54 is used in aligning the mounting plate 14 in a manner to be later described. An example of a suitable laser is one having an optical power between 1.00 and 3.50 mW and a wavelength between 640 nm and 660 nm, often referred to as a red laser.

FIG. 5 shows the laser projector 50 and the mounting device 10 with the mounting device 10 in exploded view so characteristics of its individual elements are more apparent. A feature of the embodiment of FIG. 5 not shown in connection with FIGS. 1-4 enables the rotational position of the mounting plate 14 to be adjusted with respect to the shaft 22 and the Y axis. This feature provides rotational adjustment about the Y axis in the embodiment of the invention shown in FIG. 7 as will hereafter be explained. For other embodiments, like those shown in FIGS. 1-4, 6, 8A, 8B and 9, this feature is optional and can be incorporated or omitted because in those embodiments the mounting plates 14 are otherwise adjustable rotationally about the Y axis. The shaft 22 is installed in the opening 91 of the mounting plate 14 to position the groove 90 and shoulder 92 in the mounting plate with the groove 90 opposite threaded openings 94 formed in the mounting plate. Set screws 96 engage the groove 90 to lock the mounting plate 14 in position relative to the shaft 22 when tight and unlock them for rotary adjustment when loosed. The shaft 22 and the mounting plate 14 are interconnected with enough tolerance to allow manual adjustment of the rotational position of the mounting plate 14 with respect to the shaft 22. When a desired rotational orientation is obtained set screws 96 in threaded openings 94 are tightened and extend into the groove 90 to lock the shaft 22 and mounting plate 14 in fixed position relative to each other. When loosened the set screws 96 unlock the connection between the mounting plate 14 and the shaft 22 to allow rotational adjustment of the position. Notches 98 in flanges 56 allow the housing 54 of the aligning projector 50 to pass over the set screws 96 without interference.

Figure 6:
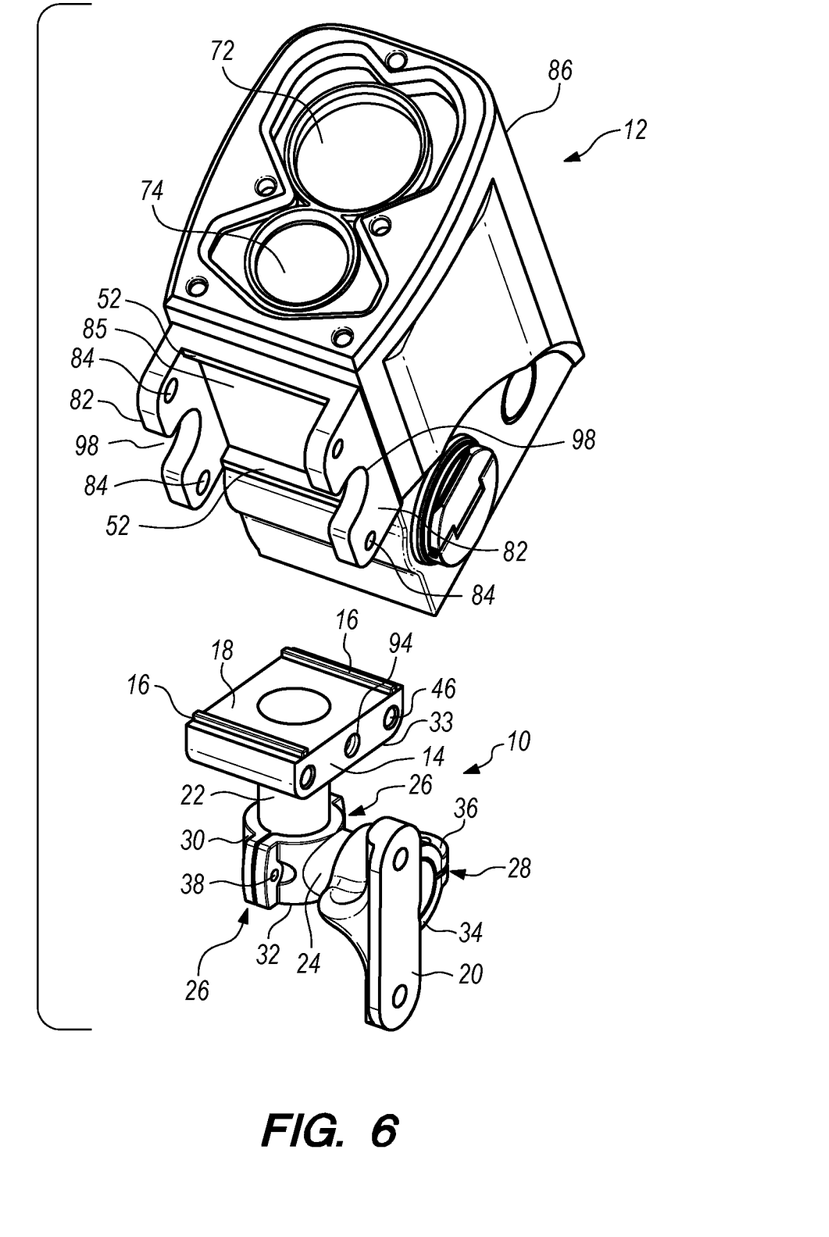
FIG. 6 shows the mounting apparatus of FIG. 3 with a rangefinder in position to be mounted thereon.

FIG. 6 shows the mounting device 10 with a rangefinder 12 in position to be mounted on the mounting plate 14. The flanges 82 of the rangefinder 12 straddle the mounting plate to bring the openings 84 into alignment with threaded openings 46 in the mounting plate 14. The slots 52 in the base 85 of the rangefinder 12, like the slots 52 in the projector 50, are configured to mate with the lugs 16 so that the orientation of the rangefinder 12 with respect to the mounting plate 14 is the same predetermined relationship that was previously established for the laser projector 50. Thus, the position of the mounting platform 14 that was determined and fixed in place with the laser projector 50 predetermines the position of the rangefinder 12 or any other auxiliary that may be mounted on the mounting device 10. Notches 98 in the flanges 82 allow the base 85 of the rangefinder 12 to pass over set screws 96 if set screws are installed in threaded openings 94. The lugs 16 and the slots 52 are but one example of a configuration to provide the same stable alignment for any one of several devices on the mounting plate 14. Two or more mating elements of almost any shape (e.g. circular, polygonal or irregular in a plan or cross-sectional view) will provide stable alignment as will two or more pins that couple with complementary mating sockets. A single non-circular lug that may be oval, polygonal or irregular in plan or cross-section and a complementary, mating socket can also provide the stable alignment.

The rangefinder 12 is a laser rangefinder having a laser emitter 74 and receiver 72 facing the target. A display 76 (see FIG. 2) facing the user displays the detected range. Element 78 (FIG. 2) is an on-off actuator. Rangefinders of this type are shown or referenced by U.S. Pat. Nos. 6,073, 352, 8,619,238, and 8,739,419, referenced above in the section entitled "Background".

Figures 7, 8A:
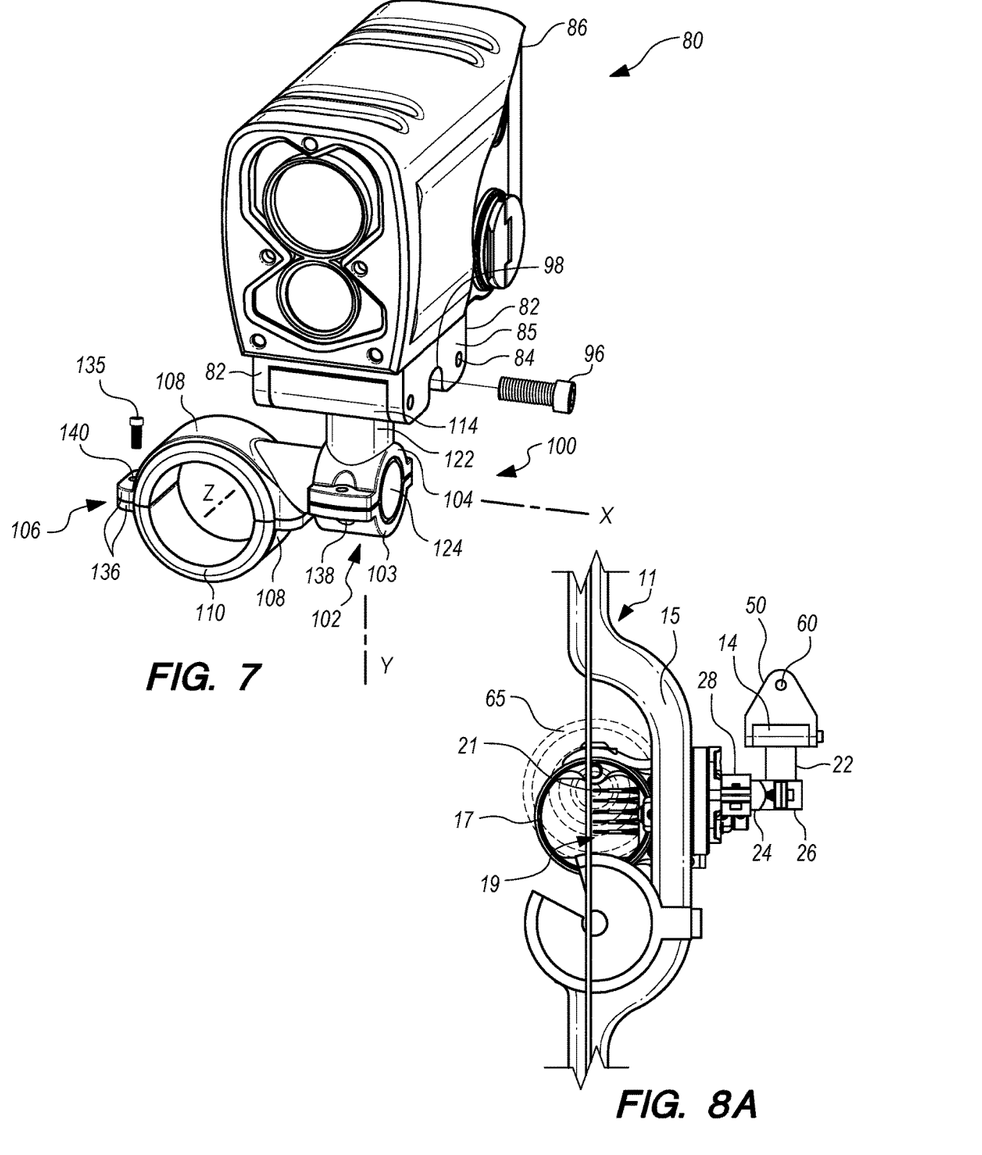
FIG. 7 is a perspective view showing an embodiment of the mounting device of this invention adapted for use with a handgun or scope and having a rangefinder mounted thereon.
FIG. 8A shows a compound bow having thereon a sighting device of a type frequently used in archery and a mounting device according to this invention with a laser aligning projector mounted on the mounting device.

FIG. 7 shows a mounting device 100 configured to work with a firearm such as a handgun or rifle or a rifle scope. A mounting plate 114 is supported on a shaft 122 extending along a Y axis. The rotary position of the mounting plate 114 can be adjusted with respect to the shaft 122, about the Y axis, to selectively adjust the rotational position of the rangefinder 80 or other device mounted on the mounting plate 114. When in a desired orientation, the mounting plate, and correspondingly the rangefinder 80 or other device, can be locked in place. The opposite portion of the shaft 122 is fixed to a journal box 102. The journal box 102 is oriented along an X axis (which corresponds to the longitudinal axis of the shaft 124) perpendicular to the Y axis (which corresponds to the longitudinal axis of the shaft 122). A second shaft 124 is at one end mounted in the journal box 102, to move longitudinally along and rotate about the X axis, and at the other end fixedly mounted to a cuff 106. The cuff 106 affixes the mounting device 100 to the gun barrel or scope of a shooting device (not shown). The cuff 106 can be affixed to a barrel structure that forms part of a projectile launcher or to the barrel of a telescopic sight for a projectile launching device.

The shaft 122, the rotatable connection of the shaft 122 to the mounting plate 114 (see FIG. 5), the journal box 102 and the shaft 124 form an articulable linkage connecting mounting plate 114 and cuff 106. The journal box 102 is formed of two half-sleeves 103 and 104. The half-sleeves are joined in any convenient manner. In the example shown the half-sleeves are connected by screws 138 in threaded openings. The half-sleeves 103 and 104 are joined so as, when loose, to hold the parts together while also permitting rotary (or orbital) motion about the X axis to be applied to mounting plate 114 and shaft 122 and, when tight, to hold the parts firmly and prevent relative motion. The half-sleeves, when loosely joined, also permit the shaft 124 to be moved linearly within the journal box 102 along the X axis. The cuff 106 is formed of a "C" shaped sleeve 108 with flanges 136 slightly open, joined by screw 135 in threaded opening 140. The flanges 136 are adjustably joined by the screw 135 so as to vary the compression exerted by the sleeve 108 on the on the gun or scope barrel. Depending on the magnitude of the compression this permits or prevents linear and rotary motion of the cuff 106 along and around the gun or scope barrel. The inner surface of the sleeve 108 is provided with a liner 110 that protects the gun or scope barrel and resists movement between the gun or scope barrel and the cuff 106 when the screw 135 is tightened in the threaded opening 140. Set screws 96 are loosed to permit the rotational position of the mounting plate 114 to be adjusted with respect to the shaft 122 and when a desired position is obtained the set screws 96 are tightened to fix the relative positions. (See FIG. 5.)

FIG. 8A will be referenced in connection with a description of the use of the mounting device 10 in a system for aligning and calibrating a rangefinder to a bow sighting device 17. The mounting device 10 is affixed to member 15 of bow 11. A sight 17 is also mounted on bow 11. The sight 17 has multiple sighting pins 19, each of which correlates with a particular distance. For example, pin 21 may correlate with a distance of 20 yards. The mounting device 10 presents the mounting plate 14 to receive first the aligning projector 50 and subsequently a rangefinder 12.

Referring to FIG. 4B, the lugs 16 on surface 18 of the mounting plate 14 correspond to the slots 52 formed in the underside of the aligning projector 50. Lugs 16 and slots 52 have complementary configurations so that the aligning projector 50 is positioned on the mounting plate 14 in a fashion that establishes a particular orientation of the aligning projector 50 with reference to the mounting plate 14. The aligning projector 50 is secured in the established orientation on the mounting plate 14 by screws (not shown) driven through the openings 48 in the flanges 56 of the aligning projector and into the corresponding threaded openings 46 in sides of the mounting plate.

Figure 8B:
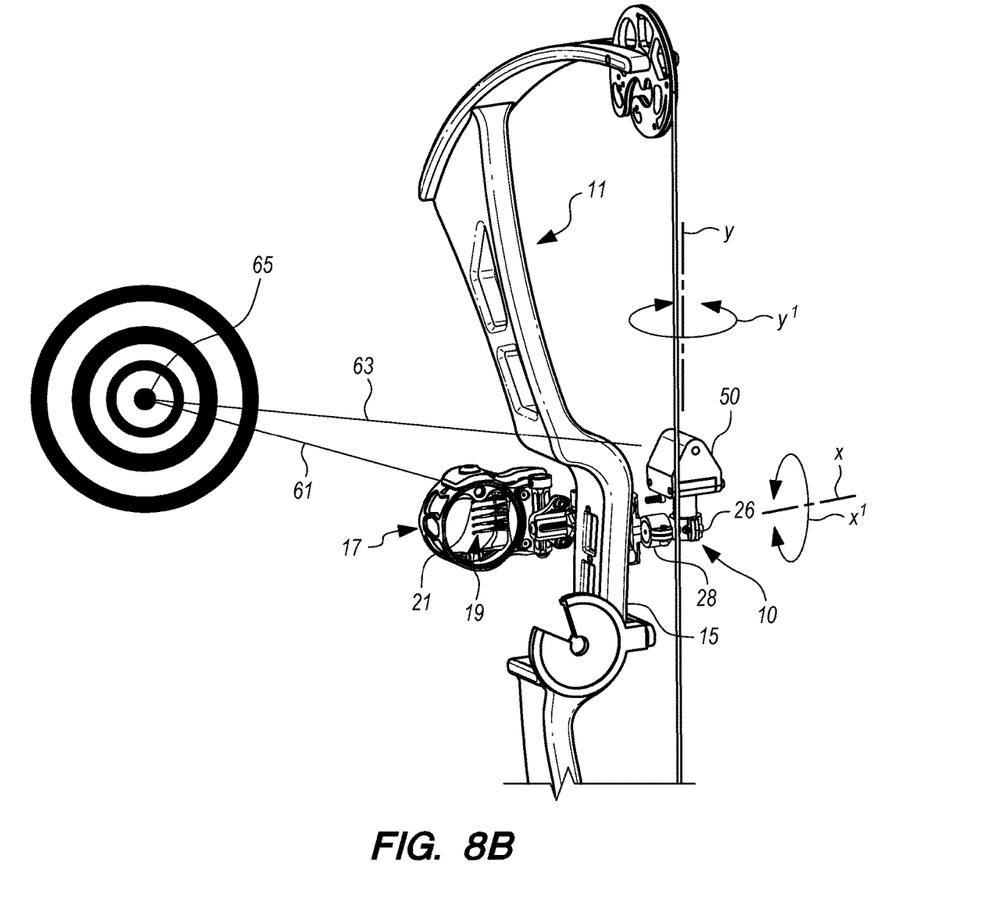
FIG. 8B shows the mounting device and laser aligning projector of FIG. 8A and a sighting device of a type shown in FIG. 8A with illustrations of a user's line of sight through the sighting device and a visible laser path from the aligning projector.

Referring to FIG. 8B, the position of the mounting plate 14 is to be aligned or calibrated with respect to the sighting device 17. A target 65 is chosen a known distance away from the bow that corresponds to the distance or range of a selected one of the sighting pins 19. Arbitrarily, for this description, a distance of 20 yards corresponding to sighting pin 21 is chosen. The archer holds the bow in position, establishes a line of sight 61 to the target through the sighting device 17 and brings the twenty-yard target into view with the sighting pin 21 centered on the target. The visible laser 60 in the aligning projector 50 is turned on. The journal boxes 26 and 28 are sufficiently loose to permit the shafts 22 and 24 to rotate and reciprocate therein so the entire linkage established by the shafts and journal boxes can be articulated. The mounting device 10 is then articulated to direct the visible laser beam 63 to the target 65 and position the spot created by the laser beam 63 on the target coincident with the spot where the archer's line of sight 61 impinges the target. The journal boxes are then tightened to fix the position of the mounting plate. The mounting plate 14 is now calibrated to the bow sight 17. The alignment projector 50 is then removed from the mounting plate 14 and the mounting plate is ready to receive a rangefinder. During the calibration procedure it is useful to have two people so one can articulate and fix the mounting device 10 while the other holds the bow 11 in position.

During articulation of the mounting device 10 to achieve calibration any one, any several or all of the possible movements can be used. The plate 14 can rotate (or orbit) about the X axis by rotating shaft 24 within journal box 28 (as indicated by the circular arrow $x^1$) to tip the visible laser beam 63 from the laser 60 angularly upward or downward with respect to the target; shaft 24 can be moved linearly within the journal box 28 to move the laser beam 63 left and right with respect to the target 65 (and the sight 17). The plate 14 can rotate about the Y axis by rotating shaft 22 within journal box 26 (as indicated by the circular arrow $y^1$) to direct the visible laser beam 63 from the laser 60 angularly leftward or rightward with respect to the target 65 (and the sight 17); shaft 22 can be moved linearly within the journal box 26 to move the laser beam up and down with respect to the target 65 (and the sight 17). The journal boxes are loose to permit the shafts 22 and 24 to move linearly and rotate within journal boxes 26 and 28 during calibration; when the calibrated position is achieved the journal boxes 26 and 28 are tightened to prevent relative movement of the shafts and journal boxes and fix the mounting plate 14 in place, in the desired position.

Once the mounting device 10 is in position with the mounting plate 14 calibrated to the sighting device 17 and its position fixed, any one of several rangefinders or other devices can be installed on the mounting plate 14 without having to recalibrate; that is, without having to reposition the mounting plate 14 relative to the shooting device 11 and its sight 17.

Figure 9:
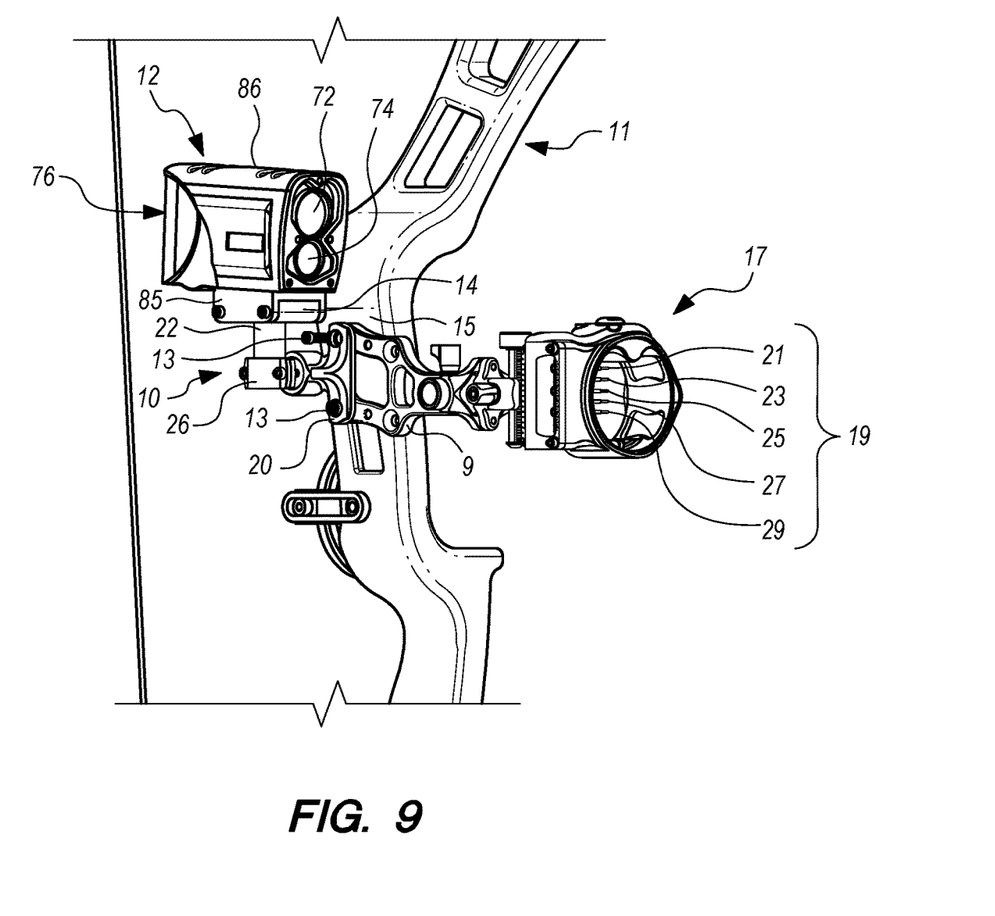
FIG. 9 shows a sighting device, a mounting device according to this invention and a rangefinder mounted on a bow as viewed from the field.

After the mounting plate 14 is calibrated to the sighting device 17 and the laser aligning projector 50 is removed from the mounting plate 14 a rangefinder 12 can be installed on the mounting plate as indicated by FIG. 6, FIG. 7 and FIG. 9.

FIG. 9 shows a compound bow 11 with a mounting device 10 and a rangefinder 12 thereon. The bracket 20 is connected to the member 15 of the bow 11 by screws 13 thus affixing the mounting device 10 to the bow 11. Element 9 mounts the sight 17 at the same location. The assembly is held by an archer in position for aiming and shooting an arrow.

The bow 11 when in position for use has the mounting device 10 and the rangefinder 12 located on one side and the sighting device 17 located on the opposite side. The sighting device 17 is the type using sighting pins 19; individual sighting pins 21, 23, 25, 27 and 29 each corresponding to a discrete shooting range or distance from the bow to a target. For example, sighting pins 21, 23, 25, 27 and 29 could correspond respectively to ranges of 20, 40, 60, 80 and 100 yards. Sighting devices of this type are shown in U.S. Pat. Nos. 6,634,110, 7,086,161, 8,619,238 and 8,739,419, referenced above in the section entitled "Background". In the view of FIG. 9 the mounting plate 14 and shaft 22 are rotated in journal box 26 so that the rangefinder 12 is slightly rotated toward the line of sight 61 through the sighting device 17 as it typically would be in use.

Referring to FIG. 6, the rangefinder 12 has a cover 86 and a base 85 forming slots 52, flanges 82 and screw holes 84. The slots 52 are formed to mate precisely with the lugs formed on surface 18 of the mounting plate 14 so the rangefinder will be oriented on the mounting plate with the same orientation established by the aligning projector 50. Thus installation of the rangefinder 12 aligns it to the bow 11 and the viewfinder 17 with the calibration previously established with the aligning projector 50 maintained. The rangefinder is secured in place by the screws driven through openings 84 in the flanges 82 and threaded openings 46 in the mounting plate 14. The rangefinder can be removed and reinstalled multiple times without losing calibration. Without recalibrating, a user may in the field remove and replace the rangefinder or replace one rangefinder with another. Various rangefinders, lights, point of view cameras and other devices equipped with a structure like base 85 may be installed on the mounting device 14 all the while maintaining the established orientation. One of the desirable features of this invention is that it enables users to install and remove rangefinders and other devices in the field and to exchange one device for another without realigning to recalibrate.

In use the rangefinder 12 is mounted on the mounting device 10 in the predetermined orientation established with the laser projector 50. The user establishes a line of sight through the sight 17 to a target at an unknown and estimated distance from the user. The user reads the distance to the target indicated on the display screen 76 of the rangefinder 12 and adjusts the line of sight through the sight 17 for the difference between the estimated distance to the target and the distance to the target indicated by the rangefinder, using the one of the sight pins 19 that most closely corresponds to the distance indicated by the rangefinder, to improve aim. With the aim corrected the user discharges the shooting device.

The device shown by FIG. 7 is used with shooting devices such as bows and other shooting devices with a telescopic sight, handguns and rifles. The aligning projector 50 is installed on the base plate 114 of the mounting device 100 in a manner similar to the installation shown by FIGS. 4A and 4B. The position of the mounting plate 114 is adjustable about three axes. The plate 114 (with aligning projector 50 thereon) and the shaft 122 can rotate (or orbit) about the X axis to tip the visible laser beam from the laser 60 angularly upward or downward with respect to the target; the shaft 124 can be moved linearly along the X axis within the journal box 102 to move the laser beam left and right with respect to the target; the rotational position of the mounting plate 114 can be adjusted relative to the longitudinal Y axis of the shaft 122; and the rotational position of the cuff 106 can be adjusted about a barrel structure on which it is mounted, that is about the Z axis. The plate 114 can rotate (orbit) about the Z axis by rotating the entire assembly about a firearm or scope barrel (not shown) within the cuff 108. Rotation about the Z axis directs the visible laser beam from laser 60 to move in an arc with respect to the target. (The Z axis aligns with the position of the barrel of a firearm or scope.) The cuff 106 can also be moved linearly along a barrel that supports it, that is along the Z axis. The journal box 102, set screws 96 and the sleeve 108 can be relaxed to permit relative movement of the parts during calibration and when the calibrated position is achieved the journal box 102, set screws 96 and the sleeve 108 are tightened to fix the parts in position.

Once the mounting device 100 is aligned with the mounting plate 114 in calibrated position and the position is fixed the aligning projector 50 is removed. Any one of several rangefinders or other devices then can be installed or interchanged on the mounting plate 114 without having to recalibrate; that is, without having to reposition the mounting plate 114 relative to the cuff 106 and the associated barrel of a gun or telescopic sight.

Viewing FIGS. 1-3, 6, 8 and 9, use in the field will be described for the compound bow 11 with the mounting device 10 thereon, which mounting device has previously been aligned and calibrated to the viewfinder 17. A rangefinder 12 is installed on the mounting plate 14 with the lugs 18 engaging the slots 52 in the base 85. The rangefinder 12 is fixed in position on the mounting device 10 by attaching, as by screws as described above, the base 85 of the rangefinder to the mounting plate 14 of the mounting device. When so installed the rangefinder 12 is aligned and calibrated to the viewfinder 17.

The archer using the on-off actuator 78 turns on the laser viewfinder 12. A laser beam emitted toward a target by element 74 is received back at element 72. An arrow is introduced into the bow 11, the archer raises the bow to shooting position and takes initial aim at the target using, for example, the pin 23 of viewfinder 17, indicative of an estimated shooting range of 40 yards. A glance at the display screen 76 may reveal, for example, a range of 50 yards. The archer will then adjust the aim so the target is sited midway between the forty-yard pin 23 and the pin 25, pin 25 being indicative of 60 yards. Then the arrow is released toward the target.

A method of using a shooting device 11 equipped with a sight 17 and the articulable rangefinder mount 10 involves the following steps:

a) sighting a target at a known distance from the shooting device 11 through the sight 17;

b) with the mounting device 10 and laser projector 50 connected to each other in a predetermined orientation and attached to the shooting device 11, articulating the mounting device 10 to direct a visible laser beam from the laser projector 50 onto the target sighted so the visible laser beam and the line of sight through the sight 17 coincide at the target to thereby calibrate (or align) the mounting device 10 to the sight 17;

c) fixing the position of the articulable rangefinder mount 10 to prevent further articulation;

d) removing the laser projector 50 from the rangefinder mounting device 10;

e) mounting a rangefinder 12 on the mounting device 10 in the orientation predetermined with the laser projector 50;

f) sighting through the sight 17 a second target at an unknown and estimated distance from the shooting device 11;

g) reading the distance indicated by the rangefinder 12;

h) adjusting the line of sight through the sight 17 for the difference between the estimated distance and the distance indicated by the rangefinder to improve aim; and i) discharging the shooting device 11 at the target.

The invention is described in connection with several preferred embodiments which are not intended to limit the scope of the invention. The invention is intended to include such alternatives and equivalents as are and may be defined by the following claims.

The invention claimed is:

1. A method for calibrating a laser rangefinder for a bow, the bow having affixed thereto a bow sight with indicators of discrete shooting ranges, wherein a laser rangefinder and a visible laser projector are adapted to be alternately mounted on the bow by an articulable linkage attachable to the bow for establishing alignment between the bow sight and, when mounted thereon, the laser projector and, when mounted thereon, the rangefinder, the method comprising the steps of:

sighting a target at a known distance from the bow through the bow sight using a bow sight indicator that corresponds to the known distance;

with the laser projector mounted on the bow by the articulable linkage articulating the articulable linkage to direct a laser beam from the laser projector onto the sighted target so the laser beam and the line of sight through the bow sight coincide at the target for calibrating the laser projector to the bow sight;

fixing the position of the articulable linkage in the position established by the previous step to prevent further articulation;

removing the laser projector from the articulable mount;

mounting the laser rangefinder on the bow by the articulable linkage with the articulable linkage in the position fixed by the fixing step;

sighting through the bow sight a second target at an unknown and estimated distance from the bow using the bow sight indicator that most closely corresponds to the estimated distance; and reading the distance to the second target indicated by the laser rangefinder; and to improve aim adjusting the line of sight through the bow sight according to the distance to the second target indicated by the laser rangefinder.

2. A method for calibrating a shooting device having a sight, an articulable rangefinder mount, a laser projector and a rangefinder comprising:

a) sighting a target at a known distance from the shooting device through the sight;

b) with the rangefinder mount and laser projector connected to each other and attached to the shooting device, articulating the mounting device to direct a visible laser beam from the laser projector onto the target sighted so the visible laser beam and the line of sight through the sight coincide at the target for aligning the mounting device to the sight;

c) fixing the position of the articulable rangefinder mount to prevent further articulation;

d) sighting through the sight a second target at an unknown and estimated distance from the shooting device;

e) reading the distance indicated by the rangefinder; and f) adjusting the line of sight through the sight for the difference between the estimated distance and the distance indicated by the rangefinder to improve aim.

3. A method according to claim 2 further comprising:

a) removing the laser projector from the rangefinder mounting device after the mounting device is aligned to the sight; and thereafter b) mounting the rangefinder on the mounting device in the alignment determined with the laser projector.

\* \* \* \* \*